(12) United States Patent
Araos Almendras

(10) Patent No.: US 11,596,949 B2
(45) Date of Patent: Mar. 7, 2023

(54) HIGH-SPEED DEWATERING AND PULVERIZING TURBINE

(71) Applicants: BIODRYINGTECH SPA, Santiago (CL); EMPRESAS IANSA S.A., Santiago (CL)

(72) Inventor: Roberto Enrique Araos Almendras, Santiago (CL)

(73) Assignees: BIODRYINGTECH SPA, Santiago (CL); EMPRESAS IANSA S.A., Santiago (CL)

( * ) Notice: Subject to any disclaimer, the term of this patent is extended or adjusted under 35 U.S.C. 154(b) by 424 days.

(21) Appl. No.: 16/624,748

(22) PCT Filed: Jun. 21, 2017

(86) PCT No.: PCT/CL2017/050026
§ 371 (c)(1),
(2) Date: Dec. 19, 2019

(87) PCT Pub. No.: WO2018/232539
PCT Pub. Date: Dec. 27, 2018

(65) Prior Publication Data
US 2020/0238294 A1 Jul. 30, 2020

(51) Int. Cl.
*B02C 19/00* (2006.01)
*A23L 19/00* (2016.01)
(Continued)

(52) U.S. Cl.
CPC .......... *B02C 19/0018* (2013.01); *A23L 19/01* (2016.08); *B02C 23/08* (2013.01); *F01D 5/02* (2013.01); *A23V 2002/00* (2013.01)

(58) Field of Classification Search
CPC ..... B02C 19/0018; B02C 19/18; B02C 23/08; B02C 13/14; B02C 13/28; B02C 13/2804; B02C 2013/145
See application file for complete search history.

(56) References Cited

U.S. PATENT DOCUMENTS 2,561,564 A * 7/1951 Crites ................... B02C 13/288
241/58
3,533,567 A * 10/1970 Willems ................... B01J 19/10
241/301
(Continued)

FOREIGN PATENT DOCUMENTS

JP       1133425 A      2/1999
RU       2010107 C1 *   3/1994
(Continued)

OTHER PUBLICATIONS

Nishibe (JP2005131655A attached NPL, English Machine translation)., retrieved date Feb. 9, 2022.*
(Continued)

*Primary Examiner* — Adam J Eiseman
*Assistant Examiner* — Mohammed S. Alawadi
(74) *Attorney, Agent, or Firm* — Vorys, Sater, Seymour and Pease LLP

(57) ABSTRACT

The present invention relates to a high-speed dewatering and pulverizing turbine (1) for obtaining solid pulverized particles and dissociating the water present, which is formed by: a) a stator (6) having circular geometry with a duct at one end (7) for the outlet of the solid pulverized particles and a duct in the bottom part (10) for the inlet of solid particles to be pulverized; b) a wheel or rotor with vanes or blades, located inside the stator; and c) a central securing assembly for adjusting and securing all the elements that form the wheel or rotor. Also described is a method for obtaining solid pulverized and dewatered particles, wherein the water present is separated.

17 Claims, 5 Drawing Sheets

(51) Int. Cl.
  *B02C 23/08*   (2006.01)
  *F01D 5/02*    (2006.01)
  *A23L 2/39*    (2006.01)
  *B02C 13/14*   (2006.01)
  *B02C 13/28*   (2006.01)
  *B02C 13/18*   (2006.01)
  *A23L 2/08*    (2006.01)
  *F01D 5/00*    (2006.01)
  *F01D 5/14*    (2006.01)
  *F01D 25/32*   (2006.01)
  *B04B 5/12*    (2006.01)

(56) References Cited

U.S. PATENT DOCUMENTS 4,245,999 A * 1/1981 Reiniger ............... B02C 21/00
                                                    241/73
4,667,888 A   5/1987 Andersen
4,813,617 A   3/1989 Know, Jr.
2004/0000069 A1 * 1/2004 Gurol .................. B02C 13/18
                                                    34/592
2011/0042498 A1 * 2/2011 Young .................. B21K 5/00
                                                    241/195

FOREIGN PATENT DOCUMENTS

RU       2366507 C1     9/2009
WO    1983001913 A1     6/1983
WO    2018232539 A1    12/2018

OTHER PUBLICATIONS

ISR/WO from parent application PCT/CL2017/050026 dated Mar. 20, 2018.

* cited by examiner

HIGH-SPEED DEWATERING AND PULVERIZING TURBINE

SCOPE OF THE INVENTION

The invention relates to dewatering and pulverizing organic and inorganic solid products in different areas of the state of the art, e.g. products such as food raw materials, in producing vegetable and fruit powder and flours, in agro-industrial wastes, in final disposition sludge from sanitation industries, and sludge and byproducts from several manufacture industries such as fishing, livestock, poultry, forestry and mining industry.

The invention is a high-speed dewatering and pulverizing turbine that is capable of breaking up solid particles and producing dissociation of the water therein. Additionally, the invention provides a procedure for breaking up the solid particles and dissociating the water therein.

BACKGROUND OF THE INVENTION

The basic element of a turbine is its wheel or rotor which comprises vanes, blades or propellers placed around the circumference of the rotor wheel.

The best-known turbines are the water turbines and the steam turbines.

US2006051210 describes a Francis turbine, and a water turbine comprising a Francis turbine. A Francis turbine, comprising a lid and a blade belt that extend between the lid and the blade belt and which define a fluid flow channel, is described. A value from 0.1 to 0.2 for the maximum thickness ratio of each blade/average length is defined. The blades or vanes have a curvature, and are smooth on their surface with no crevices or holes.

U.S. Pat. No. 5,780,935 describes a turbine system that has a hollow base member and a flared fluid outlet located above the inlet fluid conduit. A turbine runner is mounted over the fluid outlet and includes a vertical shaft connected to a generator. Additionally, a plurality of turbine blades is on the lower end of the shaft adjacent to the fluid outlet. The upper edges of the blades are parabolic.

U.S. Pat. No. 7,704,045 describes a turbine rotor blade comprising a squealer pocket on the blade tip to provide a seal between the blade tip and the outer shroud of the engine. Additionally, the blades have a row of holes extending along the pressure side wall and notches associated to each hole.

US2012057985 describes a turbine stator blade including a blade which is formed of a ceramic matrix, and a band supporting the blade. The blades are concave in shape, smooth in the inner wall, and convex in the outer wall.

WO2009/048313 describes a turbine/cyclone assembly which is intended for separating particles, from more dense to less dense, e.g., suitable for removing water from an organic product (such as grain, cereal), and also for purifying the different fluids, e.g., removing impurities from a combustion fluid. WO2009/048313 turbine removes the humidity within the particle by cavitation.

GB19540024360 mentions an aerodynamic profile designed to be used in a fluid current flowing at sound speed, e.g. a turbine or compressor wing or blade. The purpose of the teeth, which can be triangular, sinusoidal, semi-circular or trapezoidal in shape, is preventing the boundary layer detachment, thus reducing vortex formation, which consequently diminishes efficiency and speed.

In the state of the art, there are different types of blades for turbines, each one based on the function of the turbine. However, no turbines that provide the appropriate blades for pulverizing particles were found. Therefore, there is the need for having a turbine with special blades that are appropriate for attaining the best particle pulverization and dissociation of the water therein.

The object of the present invention is providing a dewatering and pulverizing turbine that is capable of breaking up solid particles and inducing dissociation of the water therein.

A further object of the present invention is providing a procedure for breaking up solid particles and dissociating the water therein.

SUMMARY OF THE INVENTION

The present invention is a high-speed dewatering and pulverizing turbine (1) that is capable of breaking up solid particles and dissociating the water therein for obtaining solid pulverized particles with dissociated water.

Additionally, the present invention describes a procedure for breaking up solid particles and dissociating the water therein.

BRIEF DESCRIPTION OF THE DRAWINGS

The invention will be described below with reference to appended drawings, in which.

DETAILED DESCRIPTION OF THE INVENTION

Figure 1:
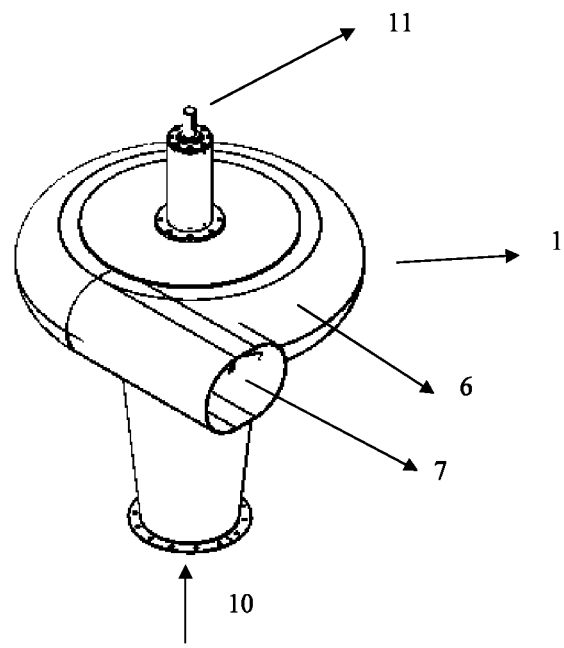
FIG. 1 shows a schematic view of the high-speed dewatering and pulverizing turbine (1) of the present invention.
Figure 2:
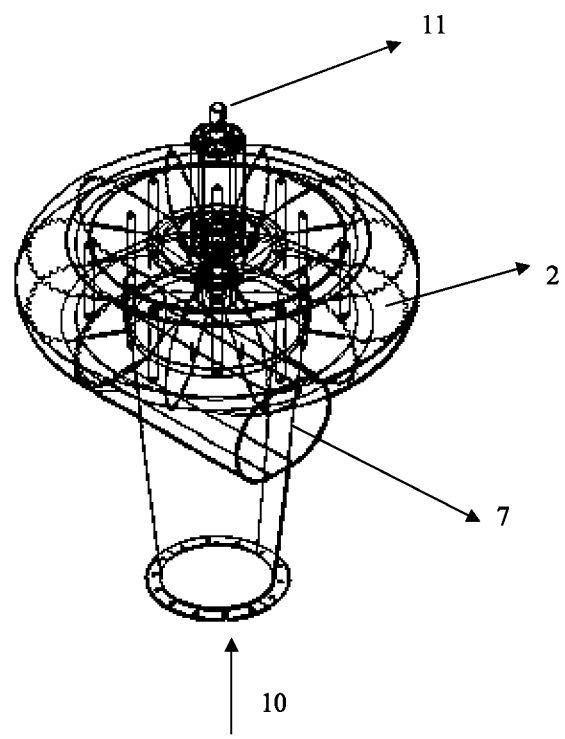
FIG. 2 shows a schematic view of the high-speed dewatering and pulverizing turbine (1) of the present invention, with a view of the inner parts.
Figure 3:
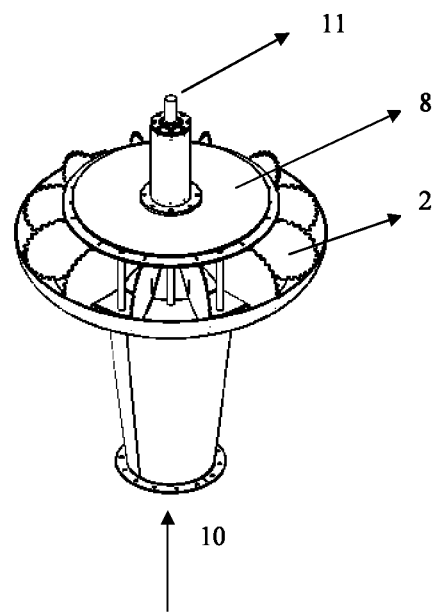
FIG. 3 shows a schematic view of the dewatering and pulverizing turbine, with a view of the inner vanes or blades (2).
Figure 4:
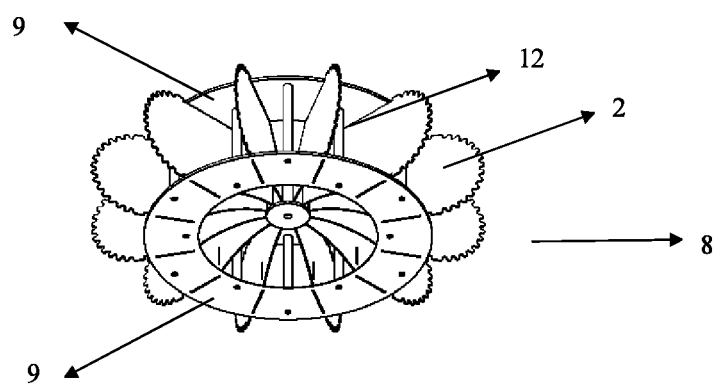
FIG. 4 shows a schematic view of the turbine inner part (wheel or rotor) containing the inner vanes or blades (2).
Figure 5:
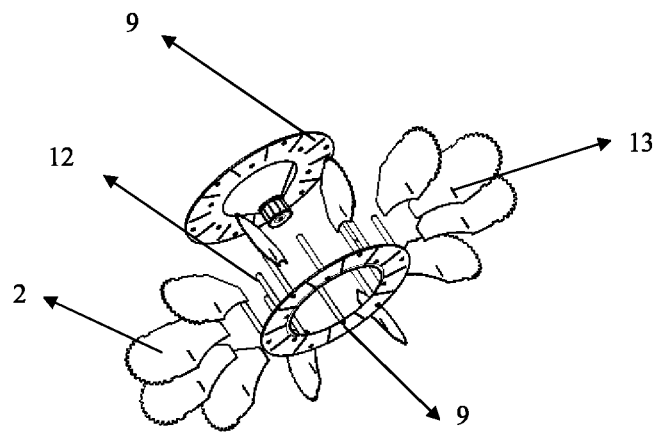
FIG. 5 shows a schematic view of the turbine inner part (wheel or rotor) containing the inner vanes or blades (2) with its parts broken down.
Figure 6:
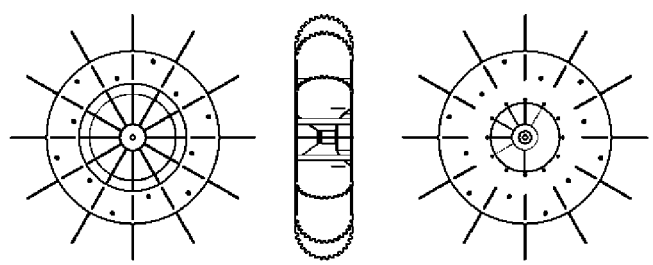
FIG. 6 shows a top, side and bottom view of the turbine inner part containing the vanes or blades.

The present invention is a high-speed dewatering and pulverizing turbine (1) for obtaining solid pulverized particles and dissociating the water present, comprising vanes or blades (2) especially designed to attain pulverization efficiently. Additionally, the present invention describes the procedure for breaking up solid particles and dissociating the water therein.

The high-speed dewatering and pulverizing turbine (1) must be mounted on a drive system supportive of its central axis (11), which allows the turbine to work at high speed, thus breaking up the solid material particles and dissociating the water within the solid material. The turbine consists of the following elements:

a stator (6) having circular geometry with a duct at one end (7) for the output of the solid pulverized particles;

a duct in the bottom part of the turbine (10) for the input of the solid particles to be pulverized;

a wheel or rotor (8) with vanes, located inside the stator, which contains the following elements:

two vane fixing and mounting plates (9) of circular shape;

a central axis (11) to fit the fixing plates (9);

at least four separating and mounting bars (12) that run parallel to the central axis (11) and attached perpendicularly through one of its ends to the fixing and mounting plates (9); and at least four vanes (2) or blades that are joined to the central axis (11) and located radially, generally flat, where each vane (2) has a lower inner slot (13) located at the bottom of one of its sides and close to the turbine inlet;

a central securing assembly for adjusting and securing all the elements that form the wheel or rotor (8).

Figure 7:
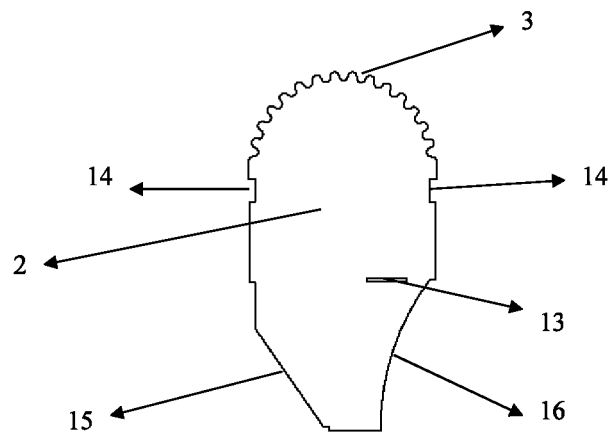
FIG. 7 shows a schematic view of the turbine vane or blade with sinusoidal upper edges (3).
Figure 8:
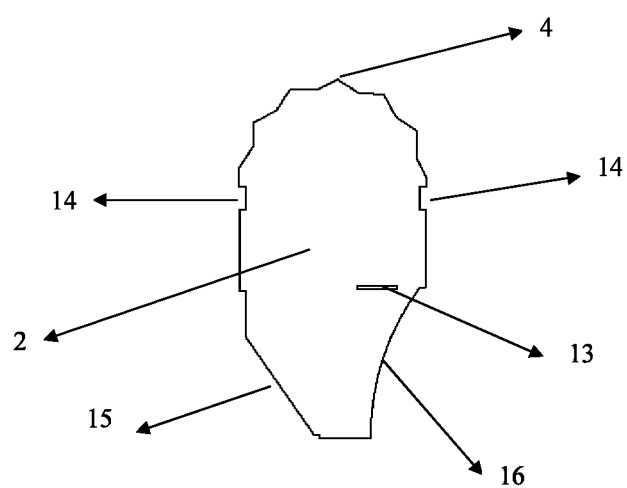
FIG. 8 shows a schematic view of the turbine vane or blade with triangular upper edges (4).
Figure 9:
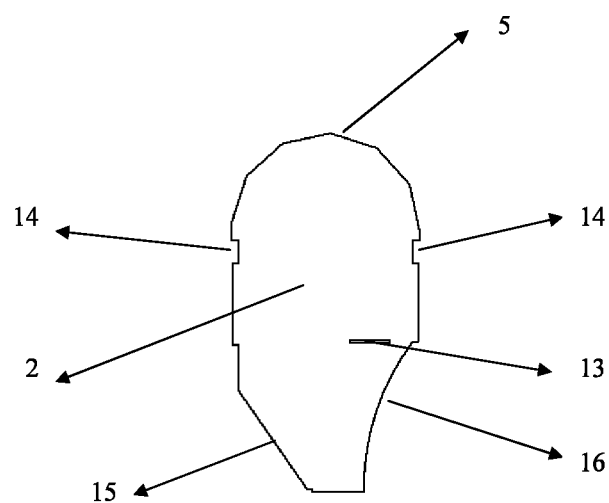
FIG. 9 shows a schematic view of the turbine vane or blade with polygonal upper edges of five or more vertices (5).

The outer shape of the top of the vanes or blades (2) can be sinusoidal (3) with square teeth or with vertices, triangular (4) or polygonal (5) with five or more vertices (see FIGS. 7, 8 and 9, respectively). For example, vanes with vertices, whose top or tip is shaped as a half a polygon of eight or more sides, or vanes with a sinusoidal-shaped tip, can be present.

Each vane or blade (2), regardless of the top shape thereof, present following the top two upper open-chute-type holes (14) at each side of the vane, and at the bottom, each vane presents a straight shape (15) on one of the sides thereof (profile) and a concave shape (16) on the other. Additionally, the same side that has the concave shape has the inner slot (13); see FIGS. 5, 7, 8 and 9. On the straight (15) and concave (16) form of the rotor (8) vanes, a resonance chamber, with acoustic amplitudes and frequencies that generate an ultrasound condition, with measures higher than 120 dB caused by the high speed and the sound as generated by the inner slot (13) due to the passage of air, is formed.

The rotor (8) can have 4, 6, 8, 10, 12, 16 or more pairs of vanes or blades (2). The vanes or blades are located along the turbine's housing or stator shape keeping a distance as defined around said housing (6).

The high-speed dewatering and pulverizing turbine (1) of the present invention comprises in its drive system a double gear box to attain its high speed. The rotational speed preferably is in the range or comprised from about 2,000 RPM to about 10,000 RPM. Additionally, the pulverizing turbine can operate at room temperature or at a set-point temperature from about 30° C. to about 100° C.

The top upper open-chute-type holes (14) at each side of the vanes (2) allow as the wheel or rotor rotates inside the stator for the free circulation of the vanes inside the stator (6) and a speed increase of the solid particles. On the other hand, the tip polygonal (5), triangular (4) or sinusoidal (3) shape of each rotor vane allows to prevent the material buildup in the stator (6) walls from stopping the equipment, i.e. the turbine friction or restraint caused by the material circulating inside the stator in the space between the fixed parts (stator walls) and the moving parts (wheel or rotor) is prevented. The brake "lining" effect with the circulating material is intended to be prevented; therefore, the vane top should be adjusted to the shape of the stator fixed parts, but with variations of the upper contour shape, such as square teeth, waves, vertices or any other shape that allows for the brake effect to be prevented. The idea is reducing the surface contour in relation to the fixed part contour, such as the vane envelope presents little shape variations in relation to the fixed part inner envelope.

On the other hand, the lower inner slot (13) of the vanes or blades allows them, by rotating at determined speeds, to generate low-frequency signals and higher-frequency harmonics to allow the material and the water particles inside the turbine to be atomized.

The procedure for breaking up the solid particles and dissociating the water therein comprises:

a.—having a high-speed dewatering and pulverizing turbine (1) as previously defined, and a drive system associated therewith;

b.—putting the drive system into operation for the turbine to attain the required high speed;

c.—inputting a current of air-borne solid particles under a condition of negative pressure or suction at the bottom (10) of the turbine (1); and d.—pulverizing the solid particles and dissociating the water within the solid particles.

The current of air-borne solid particles enters the high-speed turbine (1) at the bottom (10) by suction or negative pressure. Once inside the turbine, the air-borne solid particles spin at high speed as a result of the rotation of the turbine blades (2), as a result of the lower inner slot (13) and as a result of the shape of the rotor vanes. The particles additionally recirculate at high speeds inside the turbine. The recirculation is caused by the proximity of the pressure and suction points in the design of the high speed turbine and housing (6). In order to facilitate the particle recirculation inside the turbine, the housing (6) from the circular end to the inlet (10) is designed with conical shape, the smaller diameter of said cone matching the diameter of the lower fixing plate (9) of the turbine rotor (8). The inner design of the high-speed turbine and the vanes within the rotor allows as the rotor rotates (8) for the material circulating inside the stator to pass through the space between the fixed parts (stator) and the moving parts (wheel or rotor); the vane or blade (2) moving part must be adjusted to the stator (6) fixed parts. In turn, the function of securing assembly is double since, on the one hand, it enables securing all the pieces or elements that form the rotor (8) and, on the other, it regulates the pressure of the fixing plates (9) on the vanes (2), thus stretching or shrinking them, and preventing the solid material buildup in the stator inner surfaces. Likewise, the polygonal, triangular or sinusoidal shape of the rotor (8) vanes (2) allows preventing the material buildup in the stator (6) walls from stopping the equipment. As passing through the interior of the turbine, the air-borne solid particles exit it transformed into air-borne solid particles with micro-dispersed air-borne water.

The high-speed dewatering and pulverizing turbine has been designed to simultaneously carry out the following physical principles:

Generating negative pressure and axial and tangential offset of the input material. Generating rubbing of the input material and breakup thereof.

Generating microdispersion of the material dissociated water by generating ultrasound, which moves and displaces with the air.

Generating air pressures higher than 400 mm. wc. (millimeters, water column) and travel speeds from about 40 m/s to about 90 m/s at the inlet (10).

Causing low-frequency, high amplitude signals and secondary harmonics.

Generating material compressions in its travel through the vanes.

Generating the Bernoulli Effect that, through the vane lower inner slot (13), generates speed and pressure changes in different points of the turbine.

Preventing through the vane design the material buildup in the turbine walls.

Keeping the inflow and outflow duct geometry, thus giving priority to the material travel and the buildup in geometric discontinuities.

On the other hand, the adjustment of set-point temperatures is relevant to each material so as to prevent subjecting it to the glue (sticky) zone and allow the free travel (free flowing) condition of the material.

The invention claimed is:

1. A high-speed dewatering and pulverizing turbine for obtaining solid pulverized particles and dissociating water from food raw materials in producing vegetable and fruit powder and flours, in agro-industrial wastes, in final disposition sludge from sanitation industries, and sludge and byproducts from manufacturing industries, comprising:

a) a stator having circular geometry with an output duct for an output of the solid pulverized particles and an input duct for an input of solid particles to be pulverized;

b) a wheel or rotor with vanes or blades located inside the stator, which contains the following elements:

i) two vanes fixing and mounting plates of circular shape;

ii) a central axis to fit the fixing and mounting plates;

iii) at least four separating and mounting bars that run parallel to the central axis and are attached perpendicularly through one of its ends to the fixing and mounting plates; and iv) at least four vanes or blades that are joined to the central axis and located radially, flat, wherein each vane or blade defines a lower inner slot forming a perforation through the vane or blade and located close to the input duct, and wherein air passing through the elongate lower inner slot during operation produces a low-frequency signal and higher-frequency harmonics to allow the material and the water particles inside the turbine to be atomized; and c) a central securing assembly for adjusting and securing all the elements that form the wheel or rotor, wherein each vane or blade provides a bottom portion located near the input duct and defining a straight shape on a first side and a concave shape on a second side opposite the first side, the lower inner slot being provided adjacent the second side, and wherein each vane or blade provides a top portion opposite the bottom portion and comprising an arcuate surface that defines a plurality of teeth extending along the arcuate surface.

2. The high-speed dewatering and pulverizing turbine according to claim 1, wherein the vanes or blades further have two upper open-chute-type holes at each side of the vane, located immediately below a top of each vane or blade that is opposite a bottom part of the vane or blade that is attached to the central axis, which allow as the wheel or rotor rotates inside the stator for the free circulation of the vanes or blades inside the stator and a speed increase of the solid particles.

3. The high-speed dewatering and pulverizing turbine according to claim 1, wherein a shape of the plurality of teeth is selected from the group consisting of sinusoidal and polygonal.

4. The high-speed dewatering and pulverizing turbine according to claim 1, wherein the turbine is further mounted on a drive system supportive of its central axis, which allows the turbine to work at high speed and comprises a double gear box to attain its high speed.

5. The high-speed dewatering and pulverizing turbine according to claim 1, wherein the rotor of the turbine can have 6, 8, 10, 12, 16 or more pairs of vanes or blades, and wherein the vanes or blades are located along the turbine's stator shape keeping a distance as defined around said stator.

6. The high-speed dewatering and pulverizing turbine of claim 1, wherein the elongate lower inner slot of each vane or blade extends in a direction parallel to the central axis.

7. The high-speed dewatering and pulverizing turbine of claim 1, wherein the straight shape at the first side, the concave shape on the second side, and the lower inner slot cooperatively form a resonance chamber capable of producing acoustic amplitudes and frequencies that generate an ultrasound condition with measures higher than 120 dB caused by the high speed and the sound as generated by the lower inner slot due to the passage of air.

8. The high-speed dewatering and pulverizing turbine of claim 1, wherein the plurality of teeth prevents material buildup in the stator walls, thus avoiding friction or restraint of the turbine.

9. A procedure for obtaining solid pulverized and dewatered particles, wherein the water present is dissociated from food raw materials in producing vegetable and fruit powder and flours, in agro-industrial wastes, in final disposition sludge from sanitation industries, and sludge and byproducts from manufacturing industries, comprising:

I) having a high-speed dewatering and pulverizing turbine that comprises the following elements:

a) a stator having circular geometry with an output duct for the output of the solid pulverized particles and an input duct for the input of solid particles to be pulverized;

b) a wheel or rotor with vanes or blades, located inside the stator, which contains the following elements:

i) two vanes fixing and mounting plates of circular shape;

ii) a central axis to fit the fixing plates;

iii) at least four separating and mounting bars that run parallel to the central axis and attached perpendicularly through one of its ends to the fixing and mounting plates; and iv) at least four vanes or blades that are joined to the central axis and located radially, flat, wherein each vane or blade defines a lower inner slot forming a perforation through the vane or blade and located close to the input duct, and wherein air passing through the elongate lower inner slot during operation produces a low-frequency signal and higher-frequency harmonics to allow the material and the water particles inside the turbine to be atomized; and c) a central securing assembly for adjusting and securing all the elements that form the wheel or rotor, wherein each vane or blade provides a bottom portion located near the input duct and defining a straight shape on a first side and a concave shape on a second side opposite the first side, the lower inner slot being provided adjacent the second side, and wherein each vane or blade provides a top portion opposite the bottom portion and comprising an arcuate surface that defines a plurality of teeth extending along the arcuate surface;

II) putting the turbine into operation for the turbine to attain the required high speed;

III) inputting a current of air-borne solid particles under a condition of negative pressure or suction at the bottom of the turbine; and IV) pulverizing the solid particles and dissociating the water within the solid particles.

10. The procedure according to claim 9, wherein the current of air-borne solid particles entering the high-speed turbine at the bottom by suction or negative pressure go through the vanes or blades at high speed.

11. The procedure according to claim 10, wherein the turbine is further mounted on a drive system supportive of its central axis, which allows the turbine to work at high speed and in that the travel speed of the solid particles in the input duct is from about 40 m/s to about 90 m/s.

12. The procedure according to claim 11, wherein the rotational speed is in the range comprised from about 2,000 RPM to about 10,000 RPM.

13. The procedure according to claim 9, wherein the vanes or blades further have two upper open-chute-type holes at each side of the vane, located immediately below a top of each vane or blade that is opposite a bottom part of the vane or blade that is attached to the central axis, which allow as the wheel or rotor rotates inside the stator for the free circulation of the vanes or blades inside the stator and a speed increase of the solid particles.

14. The procedure according to claim 9, wherein a shape of the plurality of teeth is selected from the group consisting of sinusoidal and polygonal.

15. The procedure of claim 9, wherein the elongate lower inner slot of each vane or blade extends in a direction parallel to the central axis.

16. The procedure of claim 9, wherein the straight shape at the first side, the concave shape on the second side, and the lower inner slot cooperatively form a resonance chamber capable of producing acoustic amplitudes and frequencies that generate an ultrasound condition with measures higher than 120 dB caused by the high speed and the sound as generated by the lower inner slot due to the passage of air.

17. The procedure of claim 9, wherein the plurality of teeth prevents material buildup in the stator walls, thus avoiding friction or restraint of the turbine.

* * * * *